(12) United States Patent
Wayman et al.

(10) Patent No.: US 7,848,100 B2
(45) Date of Patent: Dec. 7, 2010

(54) RECONFIGURABLE MOUNTING BRACKET

(75) Inventors: Michael J. Wayman, Waconia, MN (US); Jennifer L. Casey, Eagan, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 537 days.

(21) Appl. No.: 11/691,990

(22) Filed: Mar. 27, 2007

(65) Prior Publication Data

US 2008/0237420 A1    Oct. 2, 2008

(51) Int. Cl.
*G06F 1/16* (2006.01)
(52) U.S. Cl. .................. 361/679.5; 248/200; 312/265.6
(58) Field of Classification Search .................. 248/200, 248/205.1; 312/265.2, 265.3, 265.5, 265.6, 312/223.1; 361/679.02, 679.49, 679.5, 724
See application file for complete search history.

(56) References Cited

U.S. PATENT DOCUMENTS

| | | | | |
|---|---|---|---|---|
| 5,823,650 A * | 10/1998 | Lin | ......................... | 312/348.1 |
| 6,110,245 A * | 8/2000 | Schlag et al. | .............. | 55/385.6 |
| 6,513,770 B1 * | 2/2003 | Franz et al. | .................. | 248/200 |
| 6,776,706 B2 * | 8/2004 | Kipka et al. | ................. | 454/184 |
| 6,797,044 B2 * | 9/2004 | Ou Yang et al. | ............... | 96/224 |
| 7,323,027 B1 * | 1/2008 | Fu | ............................ | 55/385.6 |
| 7,466,545 B2 * | 12/2008 | Hung | .................... | 361/679.48 |

* cited by examiner

*Primary Examiner*—A. Joseph Wujciak, III
(74) *Attorney, Agent, or Firm*—Fogg & Powers LLC

(57) ABSTRACT

A reconfigurable mounting bracket is disclosed. The bracket includes a first face plate configured to attach to an enclosure, a first flange that extends perpendicularly from a first end of the first face plate, and a second flange that extends perpendicularly from a second end of the first face plate, the second flange extending in an opposing direction from the first flange. The reconfigurable mounting bracket accommodates a plurality of attachment options.

5 Claims, 6 Drawing Sheets

RECONFIGURABLE MOUNTING BRACKET

This application is related to commonly assigned U.S. patent application Ser. No. 11/691,985, filed on even date herewith and entitled "OPEN RAIL CARD CAGE" (the '850 Application). The '850 Application is incorporated herein by reference.

BACKGROUND

In wireless communication networks, such as cellular networks, network operators typically own and operate their own base station equipment. In urban areas, costs for installing new base stations are readily recovered because of increased revenues from additional wireless network subscribers. However, network operators have less economic incentive to invest in the installation (or upgrading) of new base station equipment for similar subscribers in rural or isolated areas since the prospects for growth in the installed subscriber base are significantly more limited. Cost-effective base station equipment is necessary to meet these additional demands.

As the base station equipment requires upgrades or retrofits (or several network operators consolidate), the network operators do not always have identical categories of equipment racks for their base station equipment. Accommodating the upgraded equipment into existing equipment racks typically requires additional adapters to be purchased and installed in order to complete the retrofit. The network operators may overlook certain component suppliers for new capital expenditures if equipment manufacturers are unable to provide flexible mounting options.

SUMMARY

The following specification discusses a reconfigurable mounting bracket. This summary is made by way of example and not by way of limitation. It is merely provided to aid the reader in understanding some aspects of at least one embodiment described in the following specification.

Particularly, in one embodiment, a reconfigurable mounting bracket is provided. The bracket includes a first face plate configured to attach to an enclosure, a first flange that extends perpendicularly from a first end of the first face plate, and a second flange that extends perpendicularly from a second end of the first face plate, the second flange extending in an opposing direction from the first flange. The reconfigurable mounting bracket accommodates a plurality of attachment options.

DRAWINGS

These and other features, aspects, and advantages are better understood with regard to the following description, appended claims, and accompanying drawings where:

Reference characters denote similar elements throughout the figures and text of the specification.

DETAILED DESCRIPTION

The following detailed description describes at least one embodiment for a reconfigurable mounting bracket that accommodates various categories of equipment racks found in telecommunication equipment systems. A set of the reconfigurable mounting brackets attaches to an electronics chassis backplane and supports the chassis when mounted in the equipment rack. Advantageously, the reconfigurable mounting brackets allow for a simplified chassis disassembly (that is, removal or replacement) from the equipment rack. In one implementation, each reconfigurable mounting bracket is a single-piece removable assembly.

To accommodate the various equipment rack categories, the reconfigurable mounting bracket is reversible. In one implementation, the mounting bracket assembly comprises a filter screen and a formed sheet of reversible sheet metal. The formed reversible bracket serves as the reconfigurable component of the mounting bracket, complete with mounting alignments. When necessary, the mounting bracket assembly is removed and reversed without removing the filter screen. Removing the screen outside of controlled conditions is not desirable since the filter screen filters out (potentially damaging) air impurities when cooling the plurality of electronic assemblies within the chassis (as discussed in the '850 application) and shields against any (potential) electromagnetic interference (EMI) emissions from the chassis.

Figure 1:
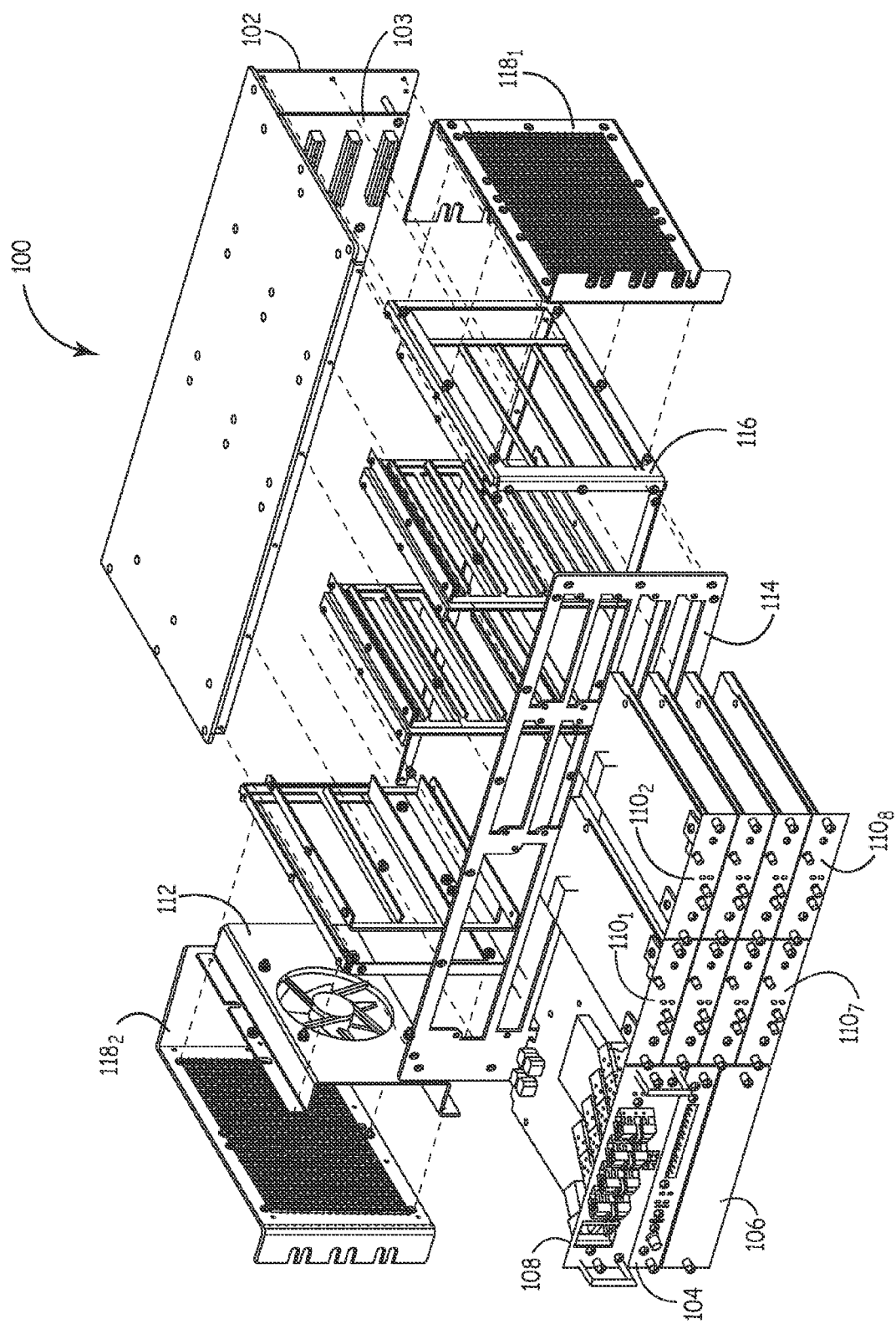
FIG. 1 is an exploded elevational view in cross-section of an electronic system with reconfigurable mounting brackets.

FIG. 1 is an exploded elevational view in cross-section of an electronics chassis 100 with reconfigurable mounting brackets $118_1$ and $118_2$. The chassis 100 comprises an electronics enclosure 102, an electronics chassis backplane 103 coupled to the enclosure 102, and an open rail card cage 116 as discussed in the '850 application. In the example embodiment of FIG. 1, a fan assembly 112 is positioned between the mounting bracket $118_2$ and the open rail card cage 116. The chassis 100 further includes an access panel side 114 that attaches to the open rail card cage 116, and a plurality of electronic assemblies. The plurality of electronic assemblies include an input/output module 108, a system controller 104, a power supply 106, and transceiver modules $110_1$ to $110_8$ as discussed in the '850 application. In the example embodiment of FIG. 1, the input/output module 108, the system controller 104, the power supply 106, and the transceiver modules $110_1$ to $110_8$ are communicatively coupled to the backplane 103.

In operation, each of the reconfigurable mounting brackets $118_1$ and $118_2$ support the enclosure 102 using at least one support attachment option. The reconfigurable mounting brackets 118 include at least one set of fastener holes to install the chassis 100 in an equipment rack (not shown). The reconfigurable mounting brackets 118 further include at least one series of mounting alignments (discussed in further detail below with respect to FIG. 2) for mounting the enclosure 102 in the equipment rack. The reconfigurable mounting brackets 118 include a filter coupled between a first face plate and a second face plate of the reconfigurable mounting brackets 118. In at least one implementation, the second face plate further comprises a gasket that forms a seal between the filter and the enclosure 102. Moreover, the filter can be sized to filter out any (potentially damaging) air impurities when cooling the plurality of electronic assemblies. Additionally, the filter can be sized with larger apertures to prevent the plurality of electronic assemblies from emitting EMI outside the enclosure when the chassis 100 is operating.

Figure 2:
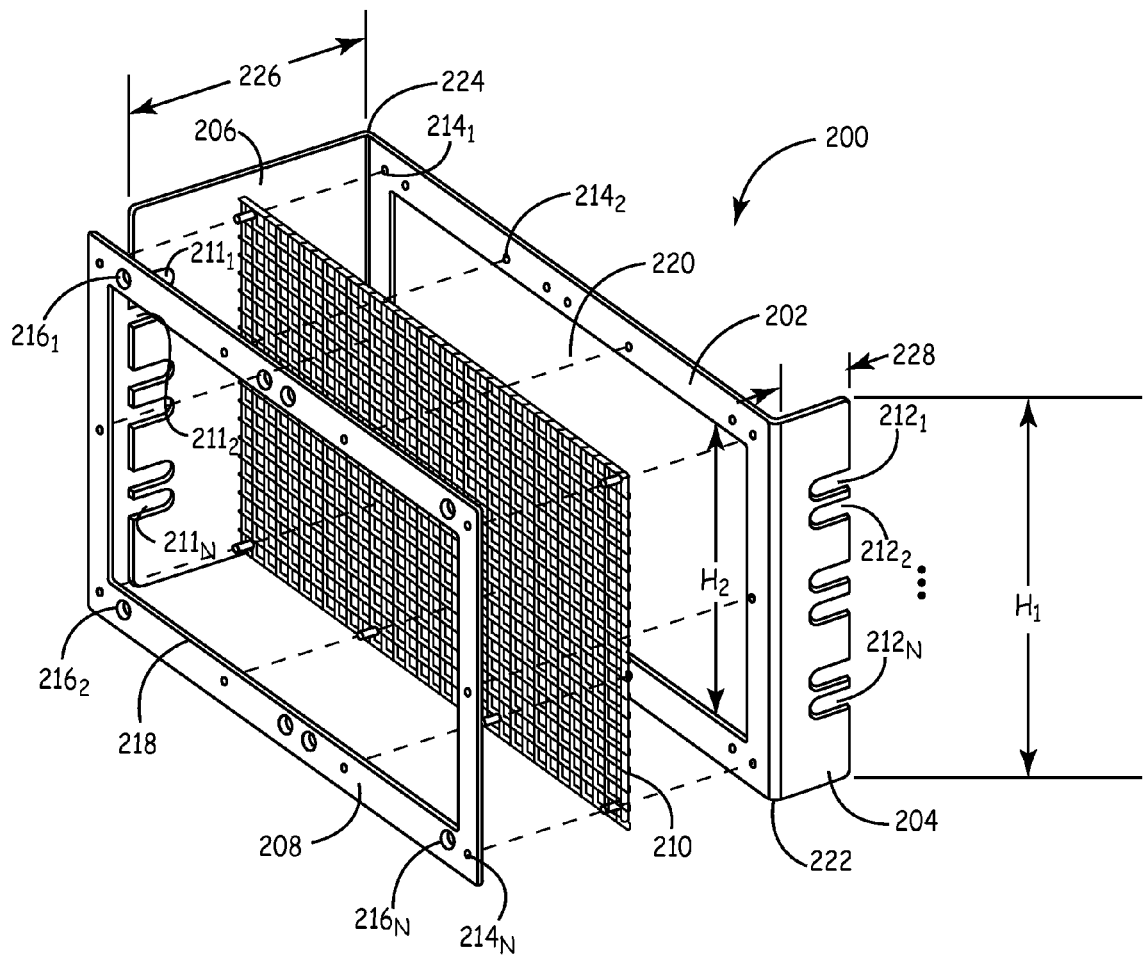
FIG. 2 is an elevational view in cross-section of the bracket of FIG. 1.

FIG. 2 is an elevational view in cross-section illustrating a mounting bracket 200 for the chassis 100. In the example embodiment of FIG. 2, the mounting bracket 200 represents the reconfigurable mounting brackets $118_1$ and $118_2$ of FIG. 1. The mounting bracket 200 comprises a first face plate 202 configured to attach to the enclosure 102 and a first flange 204 extending perpendicularly from a first end of the first face plate 202. Additionally, a second flange 206 extends perpendicularly from a second end of the first face plate 202 and opposite the first flange 204. The second flange 206 extends in an opposing direction from the first flange 204. As shown in FIG. 2, the mounting bracket 200 further comprises an (optional) second face plate 208 for securing an (optional) filter 210 between the first face plate 202 and the second face plate 208. In one implementation, the (optional) second face plate 208 comprises a gasket that forms a seal between the (optional) filter 210 and the enclosure 102 of FIG. 1. In the example embodiment of FIG. 2, the mounting bracket 200 is formed as a single assembly comprised of sheet metal. Alternate implementations for connecting the first face plate 202 with the first flange 204 and the second flange 206 (for example, one of at least a welded, clipped, and hinged connection) are contemplated.

The mounting bracket 200 further comprises at least one series of mounting alignments $212_1$ to $212_N$ and $211_1$ to $211_n$ on each of the first and second flanges 204 and 206, respectively. The at least one series of mounting alignments 212 align with at least one attachment device on an equipment rack mounting apparatus (discussed below with respect to FIG. 5) in order to secure the enclosure 102 to the equipment rack (for example, with at least one of threaded fasteners, riveted fasteners, and the like) as discussed above with respect to FIG. 1. In one implementation, the at least one series of mounting alignments 212 are slotted mounting alignments.

Figure 3:
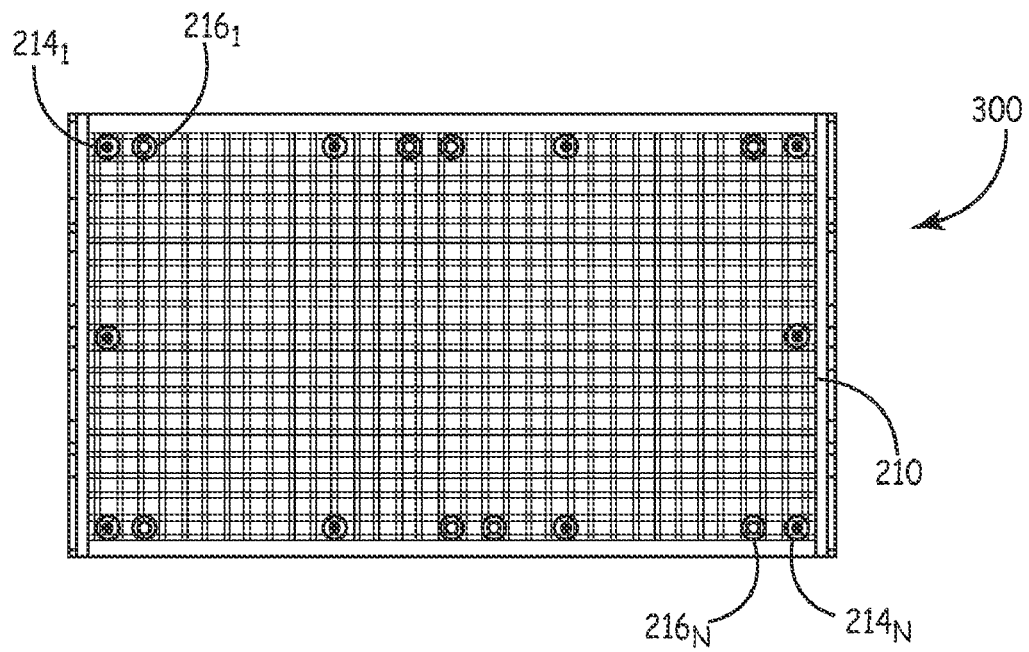
FIG. 3 is a side elevational view of a filter screen for the bracket of FIG. 2.

The first face plate 202 and the optional second face plate 208 further include at least one first set of fastener holes $214_1$ to $214_N$, and the optional second face plate 208 includes at least one second set of fastener holes $216_1$ to $216_N$ as shown in FIGS. 2 and 3. In one implementation, the at least one second set of fastener holes $216_1$ to $216_N$ are configured as a countersinking attachment for securing the (optional) second face plate 208 and the (optional) filter 210 to the enclosure 102.

In the example embodiment of FIG. 2, the first face plate 202 further comprises an (optional) first air pass-through opening 220. The (optional) second face plate 208 further comprises an (optional) second air pass-through opening 218. The (optional) first (second) air pass-through opening 220 (218) allows at least one set of assembled electronic components within the chassis 100 to have access to direct airflow in order to operate below prescribed component operating temperature ranges, as further discussed in the '850 application.

Figure 4:
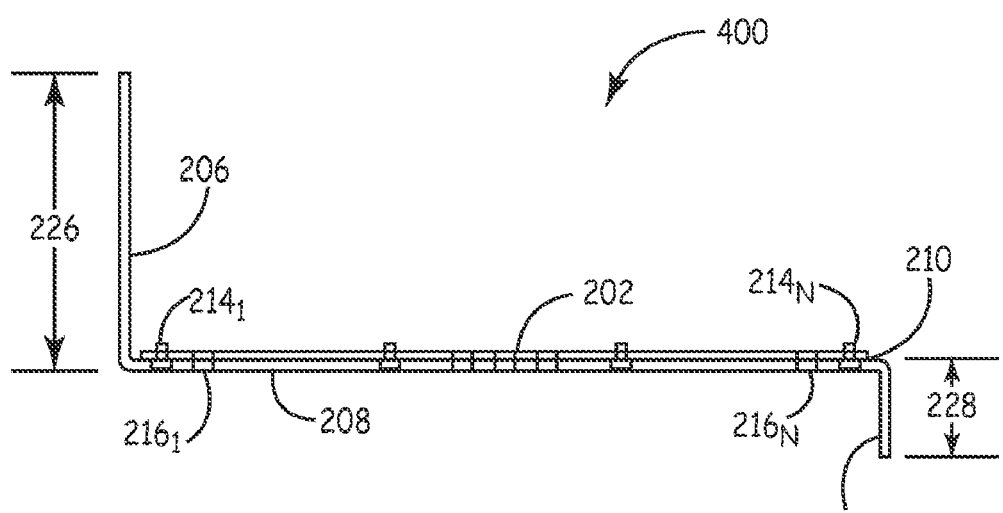
FIG. 4 is a side elevational view of the bracket of FIG. 2.

As illustrated in FIGS. 2 and 4, the first flange 204 has a length as indicated by a first extent 228 while the second flange 206 has a length as indicated by a second extent 226. As shown, the first extent 228 and the second extent 226 are different in length from each other. This feature enables the mounting bracket 200 to support the electronics chassis 100 in equipment racks of differing widths as illustrated in the example embodiment of FIG. 5. As shown generally at 500 in FIG. 5, the enclosure 102 is coupled to the mounting brackets $118_1$ and $118_2$. As shown, the mounting brackets $118_1$ and $118_2$ are configured for a first support attachment option, wherein a left rack 504 and a right rack 506 of an equipment rack 502 are a distance "w" apart from each other. In the example embodiment of FIG. 5, the mounting bracket 1181 fastens to the left side of the enclosure 102 so that the mounting alignments $212_1$ to $212_N$ of the first flange 204 are available for securing the left side of the chassis 100 to the left rack 504. The mounting bracket $118_2$ fastens to the right side of the enclosure 102 so that the mounting alignments $211_1$ to $211_N$ of the second flange 206 are available for securing the right side of the chassis 100 to the right rack 506.

Since the flanges 204 and 206 are of different lengths, by selectively flipping the mounting brackets $118_1$ and $118_2$, an equipment installer can choose which flange (of the flanges 204 and 206) is available for securing the chassis 100 to the racks 504 and 506 in order to accommodate the width "w" between the racks 504 and 506. As would be appreciated by one of ordinary skill in the art upon reading this specification, selection of the two (shorter) flanges 204 of the mounting brackets $118_1$ and $118_2$ for mounting the chassis 100 to the racks 504 and 506 will accommodate an equipment rack having a relatively shorter width "w" than the selection of the two (longer) flanges 206. Therefore, assuming that the mounting brackets $118_1$ and $118_2$ are identically dimensioned, up to three different equipment racks of three predetermined widths can be accommodated by selectively flipping the orientation of one or both of the mounting brackets $118_1$ and $118_2$. As would be appreciated by one of ordinary skill in the art upon reading this specification, if the mounting brackets $118_1$ and $118_2$ are not identically dimensioned, up to four different equipment racks of predetermined widths can be accommodated by selectively flipping the orientation of one or both of the mounting brackets $118_1$ and $118_2$.

Figure 5:
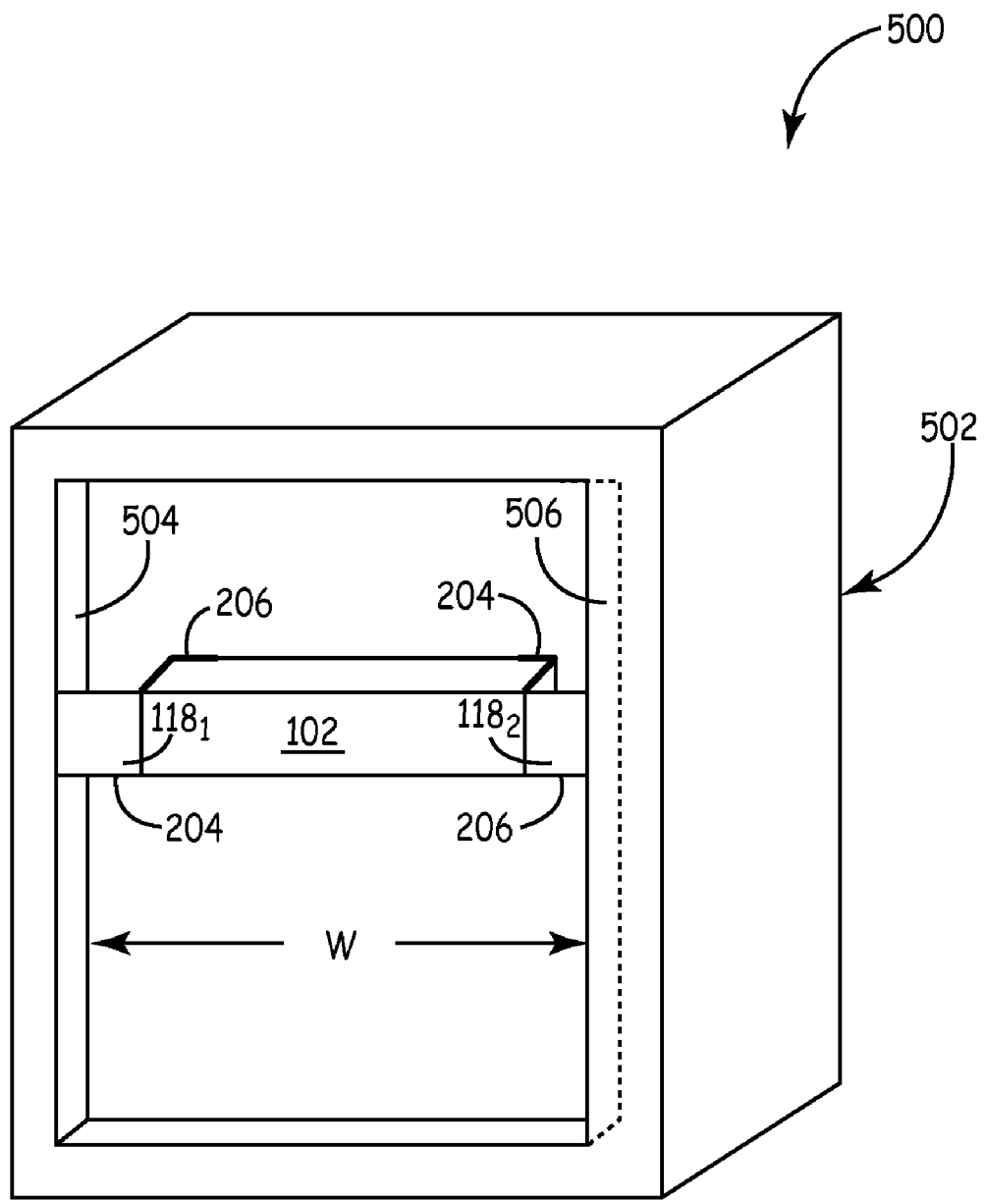
FIG. 5 is a front elevational view in cross-section of an equipment rack with the system of FIG. 1.
Figure 6:
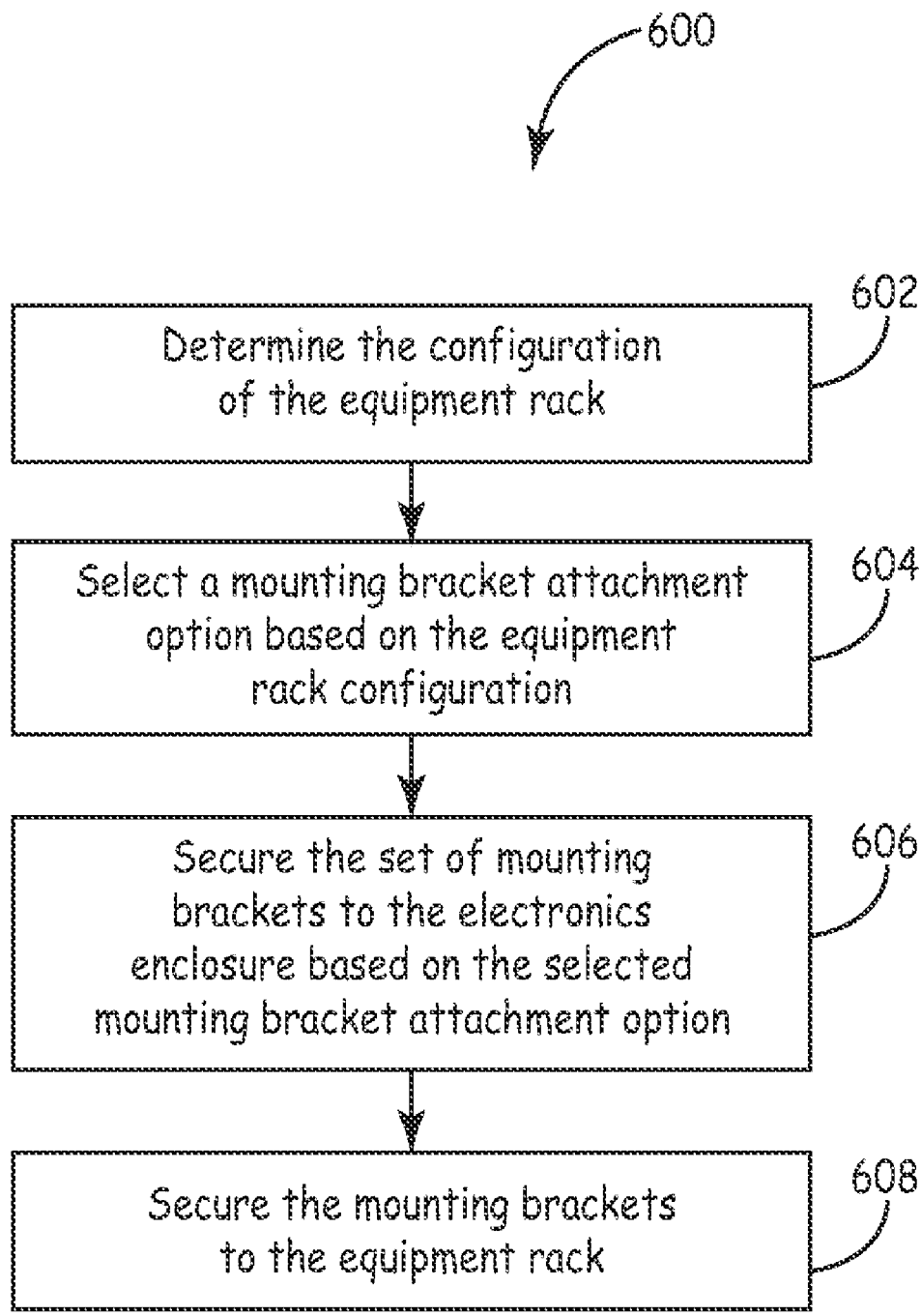
FIG. 6 is a flow diagram illustrating an embodiment of a method for mounting the system of FIG. 2 in the rack of FIG. 5.

FIG. 6 is a flow diagram illustrating a method 600 for mounting a rack mounted electronics enclosure into an equipment rack (for example, the equipment rack 502 of FIG. 5) using a set of mounting brackets (for example, the mounting brackets $118_1$ and $118_2$ of FIG. 1). The method of FIG. 6 starts at block 602 with determining the configuration of the equipment rack 502. Determining the configuration of the equipment rack 502 includes determining the nominal installation width supported by the left rack 504 and the right rack 506 of the equipment rack 502. For example, an equipment rack 502 with a nominal installation width of 19 inches will support mounting an electronics enclosure 102 that includes mounting brackets 118 designed for installation in a 19 inch equipment rack. Similarly, an equipment rack 502 with a nominal installation width of 23 inches will support mounting an electronics enclosure 102 that includes mounting brackets 118 designed for installation in a 23 inch equipment rack. The method 600 proceeds to block 604, with selecting a mounting bracket attachment option based on the configuration of the equipment rack 502 (determined in block 602). Selecting the mounting bracket attachment option comprises evaluating the set of mounting brackets 118 to determine an attachment option that will provide the rack mounted electronics enclosure 102 with an installation width (that is, the distance between the mounting alignments 212 of the left mounting bracket 118 from the mounting alignments 212 of the right mounting bracket 118) that matches the nominal installation width of the equipment rack 502. In one embodiment, selecting a mounting bracket attachment option comprises selectively flipping one or both of the left mounting bracket $118_1$ and the right mounting bracket $118_2$ until the installation width for the electronics enclosure 102 matches the nominal installation width of the equipment rack 502.

The method 600 proceeds to block 606 with securing the set of mounting brackets 118 to the electronics enclosure 102 based on the selected mounting bracket attachment option. As discussed above, in one embodiment, securing the set of mounting brackets 118 to the electronics enclosure 102 comprises attaching the face plates of the left and right mounting brackets 118, respectively, to the left and right sides of the electronics enclosure 102. In one implementation, and based on the selected mounting bracket attachment option, flanges of the desired extent are fastened to the equipment rack 502 using fasteners in the first and second set of fasteners holes 214 and 216, respectively. In one embodiment, the electronics enclosure 102 includes an air intake side and an air exhaust side as described with respect to the '850 application. In such an embodiment, securing the mounting brackets 118 to the equipment rack 502 further comprises attaching the first face plate 202 of the mounting bracket 118₁ to the air intake side of the electronics enclosure 102 and attaching the first face plate 202 of the second mounting bracket 118₂ to the air exhaust side of the electronics enclosure 102. Air pass-through openings located in the first face plates 202 (and optional second face plates 208) of the mounting brackets 118 allow direct airflow through the electronics enclosure 102 to keep electronic equipment installed therein to continue operating within prescribed operating temperature ranges. The method proceeds to block 608 with securing the mounting brackets 118 to the equipment rack 502.

Figure 7:
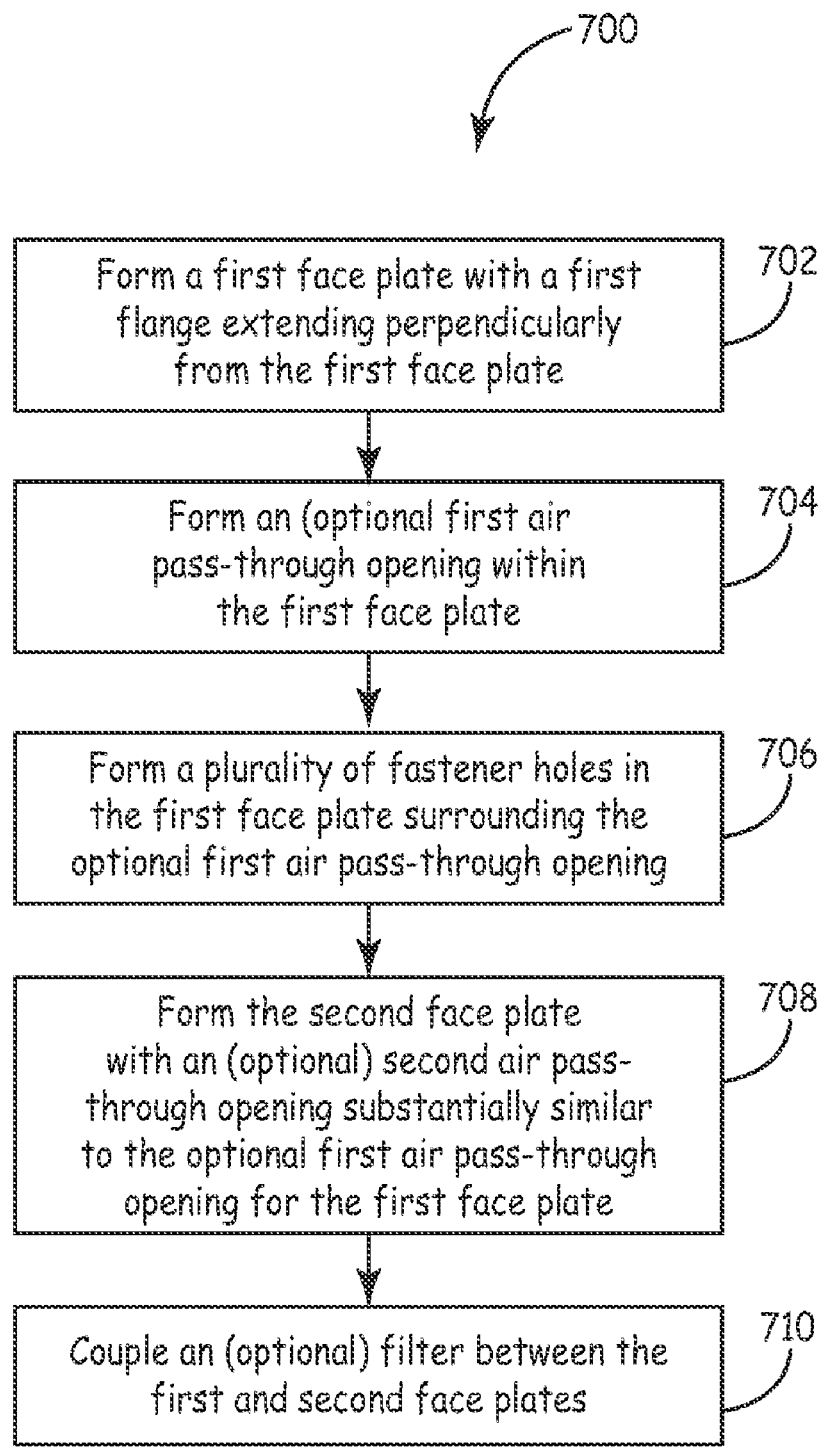
FIG. 7 is a flow diagram of an embodiment of a method for manufacturing the bracket of FIG. 2.

FIG. 7 is a flow diagram illustrating a method 700 for manufacturing the reconfigurable mounting bracket of FIG. 2. The method of FIG. 7 starts at block 702 where, in one implementation, the first face plate 202 is formed, along with the first flange 204, with a first extent 228 extending perpendicularly from the face of the plate 202. As discussed above with respect to FIG. 6, the first flange 204 accommodates at least one support attachment option for mounting the chassis 100 into one of a plurality of equipment racks of varying dimensions. The second flange 206 forms the second flange extent 226 of the first face plate 202. In the example embodiment of FIGS. 2 and 3, the first flange 204 and the second flange 206 are perpendicular to the first face plate 202. The second flange extent 226 extends in an opposing direction from the first extent 228.

Forming the first face plate 202 further comprises shaping a first metal sheet into the first face plate 202, forming the optional first air pass-through opening 220 within the first face plate 202 (block 704) and forming the plurality of fastener holes 214 in the first face plate 202 surrounding the at least one first air pass-through opening 220 (block 706). The first metal sheet is shaped into at least a first section (the first face plate 202) and a second section (at least one of the first flange 204 and the second flange 206), where the first face plate 202 and the first flange 204 (second flange 206) share a boundary 222 (224). Forming the first flange 204 (the second flange 206) includes forming the first opening 220 in the first section, the first opening 220 having a height $H_2$ less than a height of the first section $H_1$, and bending the first section with respect to the second section along the boundary 222 (224) until the first section is perpendicular to the second section, the second section forming the first flange 204 (the second flange 206). Moreover, forming the second face plate 208 comprises shaping a second sheet into the second face plate 208 (block 708) with the optional second air pass-through opening 218 formed within the second face plate 208 and substantially similar to the optional first air pass-through opening 220 for the first face plate 202. In one implementation, the second face plate 208 comprises a conductive sealing material formed as a gasket between the filter 210 and the chassis 100. Similar to the first face plate 202, the plurality of fastener holes 214 and the plurality of fastener holes 216 in the second face plate 208 substantially surround the second opening 218. In one implementation, the plurality of fastener holes 214 and the plurality of fastener holes 216 are at least one of a group of threaded, slotted and riveted fastener holes.

At block 710, the (optional) filter 210 is coupled to the reconfigurable mounting bracket 200 as illustrated in FIG. 2. In one implementation, the (optional) filter 210 comprises an air filter screen that remains attached to the chassis 100 while the set of reconfigurable mounting brackets 118 are reversed (as discussed above with respect to FIG. 1). The material composition of the (optional) filter 210 further shields an environment substantially surrounding the chassis 100 from (potential) EMI emissions from the plurality of electronic assemblies enclosed by the chassis 100. In one implementation, the (optional) filter 210 is composed of at least one of a conductive elastomer, a conductive plastic, and a shielded wire mesh. As illustrated in FIGS. 4 and 5, a plurality of mounting bracket attachment options is available with the extent 226 of the second flange 206 substantially longer than the extent 228 of the first flange 204.

This description has been presented for purposes of illustration, and is not intended to be exhaustive or limited to the form(s) disclosed. The teachings discussed herein are intended to cover any modifications, adaptations, or variations which fall within the scope of the following claims.

What is claimed is:

1. A reconfigurable mounting bracket, the bracket comprising:
   a first face plate configured to attach to an enclosure, the first face plate having a first side forming an interface that is parallel with a mounting surface of the enclosure for attaching the first face plate to the enclosure, and a second side that opposes the first side;
   a first air pass-through opening formed within the first face plate;
   a second face plate formed with a second air pass-through opening that corresponds to the first air pass-through opening;
   a filter coupled between the first air pass-through opening of the first face plate and the second air pass-through opening of the second face plate;
   a first flange that extends perpendicularly from the first side of the first face plate, wherein the first flange includes at least one mounting alignment for fastening the first flange to an equipment rack; and
   a second flange that extends perpendicularly from the second side of the first face plate, the second flange extending in an opposing direction from the first flange, wherein the second flange includes at least one mounting alignment for fastening the second flange to an equipment rack.

2. The bracket of claim 1, wherein the second face plate comprises a gasket that forms a seal with the filter.

3. The bracket of claim 1, wherein the mounting bracket is formed as a single assembly.

4. The bracket of claim 1, wherein the first flange has a longer extent than the second flange.

5. The bracket of claim 1, wherein the first flange and second flange each include at least one series of slotted mounting alignments.

* * * * *